United States Patent [19]

Tokugawa

[11] Patent Number: 4,824,175
[45] Date of Patent: Apr. 25, 1989

[54] ANCHORAGE FOR WEBBING OF VEHICLE SEAT BELT SYSTEM

[75] Inventor: Osamu Tokugawa, Fujisawa, Japan

[73] Assignee: Nippon Seiko Kabushiki Kaisha, Tokyo, Japan

[21] Appl. No.: 162,976

[22] Filed: Mar. 2, 1988

[30] Foreign Application Priority Data

Mar. 3, 1987 [JP] Japan .............................. 62-30039[U]

[51] Int. Cl.4 ............................................. A62B 35/00
[52] U.S. Cl. ................................... 297/473; 297/468; 297/471; 248/548; 248/900; 296/68.1
[58] Field of Search ............... 297/473, 471, 470, 468, 297/216; 248/900, 548; 280/805, 801; 296/65 A

[56] References Cited

U.S. PATENT DOCUMENTS

| 4,488,754 | 12/1984 | Heesch et al. | 280/805 X |
| 4,676,555 | 6/1987 | Tokugawa | 297/473 |
| 4,676,556 | 6/1987 | Yamanoi et al. | 297/473 |

FOREIGN PATENT DOCUMENTS

| 2349829 | 4/1975 | Fed. Rep. of Germany | 280/805 |
| 2634218 A1 | 2/1978 | Fed. Rep. of Germany | . |
| 2742668 | 3/1979 | Fed. Rep. of Germany | 297/470 |
| 2826634 | 1/1980 | Fed. Rep. of Germany | 297/473 |
| 2933048 | 3/1981 | Fed. Rep. of Germany | 297/471 |
| 2400898 C2 | 6/1983 | Fed. Rep. of Germany | . |
| 14293 | 4/1984 | Japan | . |

Primary Examiner—Kenneth J. Dorner
Assistant Examiner—Laurie K. Cranmer
Attorney, Agent, or Firm—Wegner & Bretschneider

[57] ABSTRACT

Disclosed herein is an anchorage for a webbing of a vehicle seat belt system. The anchorage is of the type that when an abrupt tensile force is applied to the webbing, a bracket fixed on a seat slide rail is deformed to bring a pin of a base plate secured on the bracket into engagement with a recess of an anchor stay fixed on a stationary base of a vehicle thereby to distribute the abrupt tensile force to the stationary base. The bracket comprises two parts consisting of a first bracket fixed on the seat slide rail and a second bracket which is secured on the base plate and is deformed upon application of a force of at least a predetermined value to the webbing. An engaged portion is provided with one of the first bracket and second bracket while an engaging portion is provided with the other bracket. The engaged portion and engaging portion are normally maintained in mutual engagement.

6 Claims, 3 Drawing Sheets

ANCHORAGE FOR WEBBING OF VEHICLE SEAT BELT SYSTEM

BACKGROUND OF THE INVENTION (1) Field of the Invention

This invention relates to an anchorage for a webbing of a vehicle seat belt system, which serves to distribute an abrupt tensile force applied to the webbing to a stationary base of a vehicle.

(2) Description of the Related Art

Conventional anchorages for a webbing of a vehicle seat belt system include those capable of distributing an abrupt tensile force to a stationary base of a vehicle when an occupant is thrown forward and the abrupt tensile force is hence applied to the webbing in the event of abrupt braking or collision of the vehicle.

FIG. 3 is a fragmentary perspective view of one example of such anchorages, while FIG. 4 is a schematic perspective view showing its overall construction. Designated at numeral 11 in FIG. 4 is a seat, which is composed of a seat cushion 12 and a seat back 13. The seat cushion 12 is equipped with a seat slide upper rail 14, which is reciprocal along the seat slide lower rail 15 in the sliding directions of the seat 11. An anchor stay 16 is provided alongside the seat cushion 12 in such a way the anchor stay 16 extends in the sliding directions of the seat 11. A rear end portion 16a of the anchor stay 16 is fixed on a vehicle floor (not shown) by means of an unillustrated anchor bolt. The anchor stay 16 has a plurality of teeth 16b formed along the length of the anchor stay 16. The teeth 16b are engageable with a pin 18 of the base plate 17. A bracket 19 is attached to the seat slide upper rail 14 as depicted in FIG. 3. The bracket 19 is formed of a connected plate portion 19a and a raised plate portion 19b extending upright from the connected plate portion 19a. The connected plate portion 19a is fixed on the seat slide upper rail 14 by rivets 19e,19e. The base plate 17 is secured on the raised plate portion 19b. When an abrupt tensile force of at least a predetermined value is applied to a webbing 20 depicted in FIG. 4, the base plate 17 serves to transmit the abrupt tensile force to a stationary base of a vehicle by way of the anchor stay 16. The base plate 17 is reciprocated along the length of the anchor stay 16 in accordance with reciprocal sliding movements of the seat 11. Designated at numeral 21 is a guide portion of the base plate 17. A buckle 22 to which the webbing 20 is connected in use is pivotally secured to the base plate 17 by way of a buckle anchor 23. The base plate 17 is fixed on the raised plate portion 19b of the bracket 19 by rivets 17a,17a. Numeral 16c indicates a deformable resin cover interposed between the base plate 17 and anchor stay 16.

The connected plate portion 19a of the bracket 19 is composed of an extended front plate section 19c and a rear plate section 19d. The extended front plate section 19c is formed narrower compared with the rear plate section 19d. The raised plate portion 19b extends upright from the rear plate section 19d. The bracket 19 is riveted at the extended front plate section 19c. When an abrupt tensile force of at least said predetermined value is applied to the webbing 20, the abrupt tensile force is transmitted to the raised plate portion 19b via the base plate 17. As a consequence, the bracket 19 is deformed around the boundary between the rear plate section 19d and extended front plate section 19c in a direction indicated by arrow C, namely, in a direction that the rear plate section 19d is pulled away from the seat slide upper rail 14.

Since the brackets is deformed as described above upon application of the abrupt tensile force of at least said predetermined value to the webbing 20, the pin 18 is brought into engagement with one of the teeth 16b and the abrupt tensile force applied to the webbing 20 is hence distributed to the stationary base of the vehicle.

In order to ensure the prevention of any deformation by a tensile force smaller than the predetermined value in the conventional anchorage, the bracket 19 must have greater thickness and width. Corollary to this, a wider space is required to accommodate such a thick and wide bracket. It is also necessary to leave a space above the upper rail so that the bracket is allowed to move upwards when a force of said predetermined value or greater is applied to the webbing. The seat is usually located above the upper rail, thereby making it difficult to leave such a space for the upward movement of the bracket in many instances.

SUMMARY OF THE INVENTION

An object of this invention is therefore to provide a webbing anchorage which permits the use of a thinner and narrower bracket compared with the conventional anchorages and upon application of an abrupt tensile force of at least a predetermined value to an associated webbing, also allows the bracket to undergo deformation without need for a space between a seat slide rail and a member arranged above the seat slide rail and moreover without interfering the member.

In one aspect of this invention, there is thus provided an anchorage for a webbing of a vehicle seat belt system. The anchorage is of the type that when an abrupt tensile force is applied to the webbing, a bracket fixed on a seat slide rail is deformed to bring a pin of a base plate secured on the bracket into engagement with a recess of an anchor stay fixed on a stationary base of a vehicle thereby to distribute the abrupt tensile force to the stationary base. The bracket comprises two parts consisting of a first bracket fixed on the seat slide rail and a second bracket which is secured on the base plate and is deformed upon application of the abrupt tensile force of at least said predetermined value to the webbing. An engaged portion is provided with one of the first bracket and second brackets, while an engaging portion is provided with the other bracket. The engaged portion and engaging portion are normally maintained in mutual engagement.

According to the present invention, the bracket has two parts, namely, the first bracket fixed on the seat slide rail and the deformable second bracket. The engaged portion, for example, a recess is provided with either one of the first and second brackets, while the engaging portion, for example, a lug is provided with the other bracket. When the abrupt tensile force of at least said predetermined value is applied to the webbing, the engaging portion is deformed substantially or broken so that the deformable second bracket is deformed. As a result, the base plate supported on the second bracket is caused to turn, whereby the pin fixed on the base plate is brought into the recess of the anchor stay so as to distribute the abrupt tensile force to the stationary base of the vehicle. Owing to the above construction, the second bracket is normally prevented from deformation by its own rigidity and its engagement with the first bracket. It is hence possible to prevent the bracket from deformation even when the bracket has smaller thickness and width compared with those employed in the conventional anchorages. In addition, the second bracket does not interfere a member arranged above the seat slide rail even when the second bracket is caused to move upon application of the abrupt tensile force, because the second bracket is located at a position apart from the seat slide rail.

BRIEF DESCRIPTION OF THE DRAWINGS

The above and other objects, features and advantages of the present invention will become apparent from the following description of the invention and the appended claims, taken in conjunction with the accompaying drawings, in which:

DETAILED DESCRIPTION OF THE INVENTION AND PREFERRED EMBODIMENT

Figure 1:
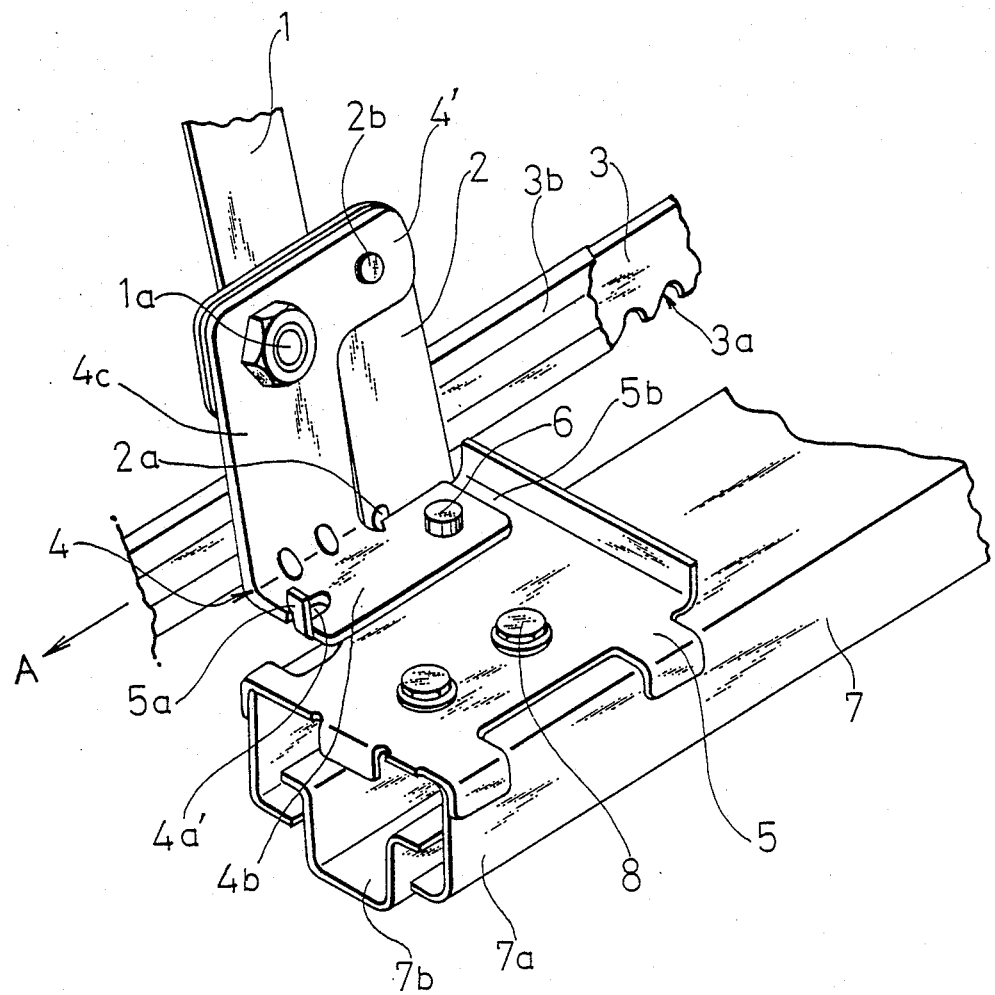
FIG. 1 is an anchorage according to one embodiment of this invention, which is suited for use with a webbing of a vehicle seat belt system.
Figure 2:
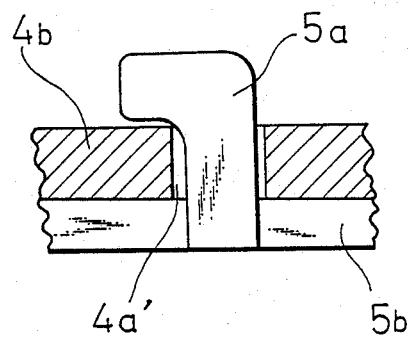
FIG. 2 shows the state of engagement between plate as a first bracket and another plate as a second bracket.
Figure 3:
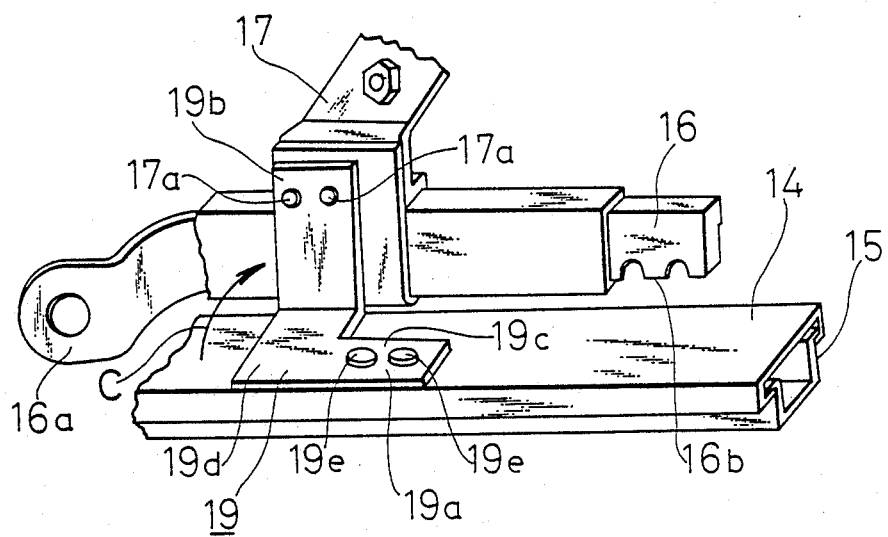
FIG. 3 is a fragmentary perspective view of a conventional anchorage.
Figure 4:
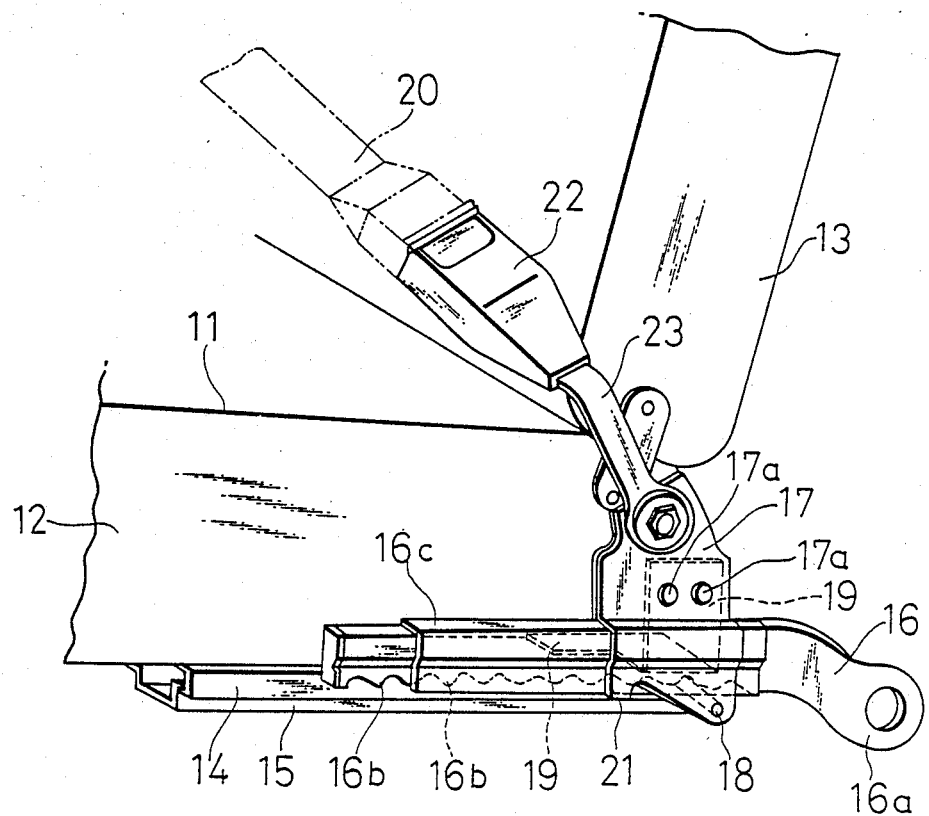
FIG. 4 is a perspective view showing the overall construction of the conventional anchorage of FIG. 3.

Referring to FIGS. 1 and 2, an anchor stay 3 extends in parallel with a seat slide rail 7 and its rear end (on the side indicated by letter A in FIG. 1) is secured by a bolt on a stationary base of a vehicle. This bolt, stationary base and vehicle are not illustrated in FIG. 1. The anchor stay 3 is covered by a deformable resin cover 3b. The rail 7 is composed of an upper rail 7a and a lower rail 7b. On the upper rail 7a movable responsive to sliding of an associated seat (not shown), a plate 5 is fixed as a first bracket by two bolts 8. Only one bolt may be used instead of the two bolts 8. The plate 5 includes an extension 5b which extends out toward the anchor stay 3 beyond the upper rail 7a. A plate 4' is connected as a second bracket to the extension 5b in such a way that the base portion 4b of the plate 4' and the extension 5b are secured by a pin 6 and a lug 5a extending upright from the extension 5b is received within a recess 4a' formed in one edge of the base portion 4b. A base plate 2 is supported on a raised portion 4c of the plate 4' by a staked pin 2b and an attachment bolt 1a for a buckle anchor 1. The base plate 2 is slidable along the anchor stay 3. As is apparent from the above description, the bracket 4 is composed of the plate 5 fixed on the upper rail 7a by the bolts 8 and the plate 4' which is deformable upon substantial deformation or breakage of the lug 5a.

When an abrupt tensile force of at least a predetermined value is applied to an associated webbing, for example, in the event of collision or abrupt braking of a vehicle on which the anchorage is mounted, the tensile force is transmitted to the buckle anchor 1 and then to the plate 4' which is connected to the buckle anchor 1 via the base plate 2. As a result, a force is exerted on the plate 4' in such a direction that the plate 4' is turned clockwise about the pin 6 as viewed in FIG. 1. The lug 5a of the extension 5b of the plate 5 is hence deformed substantially or broken, so that the plate 4' is deformed. This causes the base plate 2 supported on the plate 4' to turn. As a consequence, the pin 2a fixed on the base plate 2 pushes and bends the deformable resin cover 3b and then engages one of the recesses 3a of the anchor stay 3. Accordingly, the tensile force applied to the webbing is distributed to the stationary base of the vehicle. Here, the upward deformation or movement of the plate 4' takes place smoothly without interference with the seat or the like arranged above the upper rail 7a, since the plate 4' is attached to the extension 5b of the plate 5.

In the above-described embodiment, the lug is formed as an engaging portion on the first bracket and the recess is formed as an engaged portion in the second bracket. Needless to say, no problem or inconvenience will arise when the above combinations are reversed.

I claim:

1. In an anchorage for a webbing of a vehicle seat belt system, said anchorage being of the type that when an abrupt tensile force is applied to the webbing, a bracket fixed on a seat slide rail is deformed to bring a pin of a base plate secured on the bracket into engagement with a recess of an anchor stay fixed on a stationary base of a vehicle thereby to distribute the abrupt tensile force to the stationary base, the improvement wherein the bracket comprises a first bracket fixed on the seat slide rail and a second bracket which is secured on the base plate and is deformed upon application of the abrupt tensile force of at least said predetermined value to the webbing, an engaged portion is provided with one of the first bracket and second bracket, an engaging portion is provided with the other bracket, the engaged portion and engaging portion are normally maintained in mutual engagement, and the second bracket is L-shaped and has a base portion which is seated on the first bracket.

2. In an anchorage for a webbing of a vehicle seat belt system, said anchorage being of the type that when an abrupt tensile force is applied to the webbing, a bracket fixed on a seat slide rail is deformed to bring a pin of a base plate secured on the bracket into engagement with a recess of an anchor stay fixed on a stationary base of a vehicle thereby to distribute the abrupt tensile force to the stationary base, the improvement wherein the bracket comprises a first bracket fixed on the seat slide rail, a second bracket secured on the base plate, and a fastening means for uniting together the first and second brackets at front parts thereof as viewed in the direction of the seat slide rail one of the first bracket and second bracket is provided with an engaged portion at a rear part thereof as viewed in the direction of the seat slide rail and the other bracket is provided with a matching engaging portion at a rear part thereof, and the engaged portion and engaging portion are normally maintained in mutual engagement but when a load of at least a predetermined value is applied to the base plate, the mutual engagement between the engaged portion and engaging portion is released so as to permit deformation of the second bracket.

3. The anchorage as claimed in claim 2, wherein the engaged portion is a recess and the engaging portion is a lug.

4. The anchorage as claimed in claim 2, wherein the anchor stay is arranged alongside the seat slide rail with an interval left therebetween, the first bracket has an extension extending toward the anchor stay beyond the seat slide rail, and the second bracket is supported on the extension.

5. The anchorage as claimed in claim 4, wherein the engaging portion is provided with the extension of . the first bracket, the engaged portion is provided with the second bracket at a location corresponding to the engaging portion of the first bracket, and a means uniting the first and second brackets together is provided on a side forward the engaging and engaged portions as seen in the longitudinal direction of the seat slide rail.

6. In an anchorage for a webbing of a vehicle seat belt system, said anchorage being of the type that when an abrupt tensile force is applied to the webbing, a bracket fixed on a seat slide rail is deformed to bring a pin of a base plate secured on the bracket into engagement with a recess of an anchor stay fixed on a stationary base of a vehicle thereby to distribute the abrupt tensile force to the stationary base, the improvement wherein the anchor stay is arranged alongside the seat slide rail with an interval left therebetween, and the bracket comprises a first bracket fixed on the seat slide rail and a second bracket which is secured on the base plate and is deformed upon application of the abrupt tensile force of at least said predetermined value to the webbing, the first bracket has an extension extending toward the anchor stay beyond the seat slide rail, the second bracket is formed of a substantially L-shaped plate member having a base portion seated on the extension of the first bracket and a raised portion extending upright from the base portion, an engaged portion is provided with one of the first bracket and second bracket, an engaging portion is provided with the other bracket, and the engaged portion and engaging portion are normal maintained in mutual engagement.

* * * * *